United States Patent [19]

Schlesinger et al.

[11] Patent Number: 4,661,587
[45] Date of Patent: Apr. 28, 1987

[54] BIS 1:2 CHROMIUM COMPLEXES OF DISAZO AND AZO OR AZOMETHINE DYES

[75] Inventors: Ulrich Schlesinger, Binzen, Fed. Rep. of Germany; Fabio Beffa, Riehen, Switzerland

[73] Assignee: Ciba-Geigy Corporation, Ardsley, N.Y.

[21] Appl. No.: 730,027

[22] Filed: May 3, 1985

[30] Foreign Application Priority Data

May 10, 1984 [CH] Switzerland ............. 2305/84

[51] Int. Cl.$^4$ .............. C09B 45/26; C09B 45/48; D06P 1/10; D06P 3/32
[52] U.S. Cl. .................................. 534/696; 534/695; 534/697; 534/698; 534/699; 534/710; 534/712; 534/713; 534/722; 534/724; 534/739; 534/744
[58] Field of Search .............. 534/695, 697, 696, 698, 534/699

[56] References Cited

U.S. PATENT DOCUMENTS

| 4,256,633 | 3/1981 | Beffa | 534/695 X |
| 4,340,536 | 7/1982 | Beffa | 534/696 |
| 4,493,798 | 1/1985 | Beffa | 534/697 |
| 4,502,860 | 3/1985 | Back | 534/699 X |

FOREIGN PATENT DOCUMENTS 0005207 11/1979 European Pat. Off. ............ 534/695

Primary Examiner—Floyd D. Higel
Attorney, Agent, or Firm—Edward McC. Roberts; Meredith C. Findlay; Kevin T. Mansfield

[57] ABSTRACT

Disclosed are chrome complex dyes of the formula

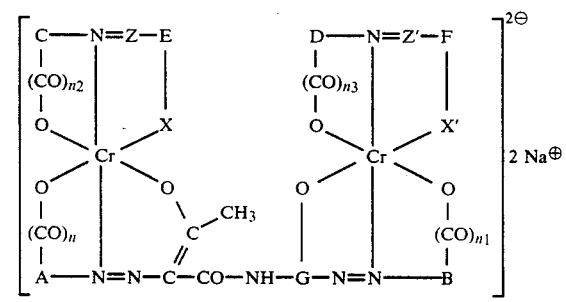

and of the formula

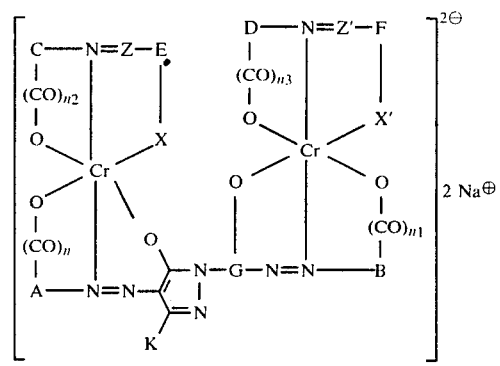

wherein
Z and Z' independently of one another are each nitrogen or —CH—;
X and X' independently of one another are each oxygen, or a group of the formula —NR—, in which R is hydrogen or $C_1$-$C_4$-alkyl, provided X is oxygen when Z is —CH— and provided X' is oxygen when Z' is —CH—;
A and B independently of one another are each a diazo component of a benzene or naphthalene radical which carries the hydroxyl or carboxyl group in the o-position with respect to the azo group;
C and D independently of one another are each a benzene or naphthalene radical which carries in the o-position with respect to the azo or azomethine group a hydroxyl or carboxyl group, or the radical of an aliphatic or cycloaliphatic aminocarboxylic acid, if $n_2$ or $n_3$ is 1 and Z or Z' is CH;
E and F independently of one another are each the radical of a coupling component when Z or Z' is nitrogen, the coupling component containing in the o- and -positions with respect to the azo group the groups X and X', respectively, or the radical of an o-hydroxyaldehyde when Z or Z' is —CH—;
n, $n_1$, $n_2$ and $n_3$ independently of one another are each zero or 1;
Ka$^\oplus$ is a cation; and
G is an unsubstituted or substituted benzene or naphthalene radical which contains the OH group in the o-position with respect to the coupling position on the group G; and
K is the $C_1$-$C_4$-alkyl group or a —COOR or the

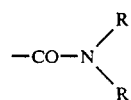

group, in which R is hydrogen or $C_1$-$C_4$-alkyl.

10 Claims, No Drawings

BIS 1:2 CHROMIUM COMPLEXES OF DISAZO AND AZO OR AZOMETHINE DYES

The present invention relates to chrome complex dyes of the formula I

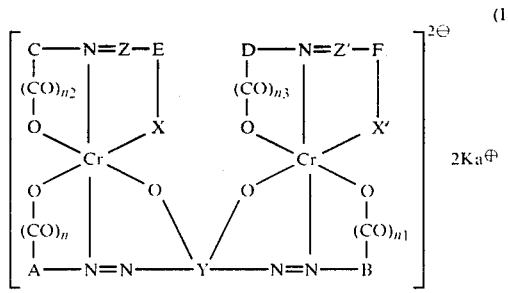

wherein

Z and Z' independently of one another are each nitrogen or a —CH— group,

X and X' independently of one another are each oxygen, or a group of the formula —NR—, in which R is hydrogen or $C_1$-$C_4$-alkyl, X having to be oxygen when Z is the —CH— group and X' having to be oxygen when Z' is the —CH— group, A and B independently of one another are each the radical of a diazo component of the benzene or naphthalene series, which radical carries the hydroxyl or carboxyl group in the o-position with respect to the azo group, C and D independently of one another are each a radical of the benzene or naphthalene series, which radical carries in the o-position with respect to the azo or azomethine group a hydroxyl or carboxyl group, or, if $n_2$ and/or $n_3$ are 1 and Z and/or Z' are a —CH— group, also the radical of an aliphatic or cycloaliphatic aminocarboxylic acid, E and F independently of one another are each the radical of a coupling component when Z and/or Z' are nitrogen, the coupling component containing in the o- and α-positions with respect to the azo group the groups X and X', respectively, or the radical of an o-hydroxyaldehyde when Z and/or Z' are the —CH— group, n, $n_1$, $n_2$ and $n_3$ independently of one another are each zero or 1, Ka⊕ is a cation, and Y is the radical of a coupling component of the formula II or III $$CH_3-CO-CH_2-CO-NH-G-OH \quad (II)$$

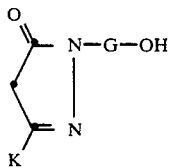

wherein G is an unsubstituted or substituted benzene or naphthalene radical which contains the OH group in the o-position with respect to the coupling position on the group G, and K is the $C_1$-$C_4$-alkyl group or a —COOR or

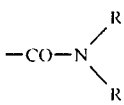

group, in which R is hydrogen or $C_1$-$C_4$-alkyl.

In the chrome complex dyes of the above formula I according to the invention, the radicals A, B, C and D can carry one or more further substituents, for example low-molecular alkyl or alkoxy, halogen, for example chlorine or bromine, nitro, cyano, sulfo, carboxyl, phosphono, alkylsulfonyl, such as methylsulfonyl, sulfamides, for example sulfamide or N-methylsulfamide, or acylamino. By low-molecular alkyl or alkoxy groups in this application are in general meant those having 1 to 6, preferably 1 to 2, C atoms; and by "acylamino" are denoted low-molecular alkanoylamino, alkylsulfonylamino and alkoxycarbonylamino groups, as well as sulfonylamino, aroylamino and arylsulfonylamino groups.

The radicals A, B, C and D are derived for example from the following amines: anthranilic acid, 4- or 5-chloroanthranilic acid, 4- or 5-sulfoanthranilic acid, 2-amino-3-naphthoic acid, 2-amino-1-hydroxybenzene, 4-chloro- and 4,6-dichloro-2-amino-1-hydroxybenzene, 4- or 5-nitro-2-amino-1-hydroxybenzene, 4-chloro-, 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-sulfonamido-2-amino-1-hydroxybenzene, 1-hydroxy-2-amino-benzene-4-sulfoanthranilide, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 6-nitro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid, 1-amino-2-hydroxy-6-chloronaphthalene-4-sulfonic acid, 1-amino-2-hydroxynaphthalene-4,6-disulfonic acid and 2-amino-1-hydroxybenzene-4,6-disulfonic acid.

Applicable for A, B and particularly for C and D, in place of the aforementioned amines having hydroxyl groups, are also corresponding methoxy compounds or corresponding compounds of which the hydroxyl group has been tosylated, such an anisidine, 4- or 5-chloroanisidine, 4- or 5-nitroanisidine, anidisidine-4- or -5-sulfonic acid, or tosylated 1-hydroxy-2-aminobenzene, the methoxy or O-tosyl group being converted, before or during metallisation, into an OH group. Compounds having these groups are used in particular when the corresponding 1-hydroxy-2-amino compounds do not couple well.

Furthermore, C and/or D can be, if $n_2$ and/or $n_3$ equal 1 and Z is a —CH— group, also the radical of an aliphatic or cycloaliphatic aminocarboxylic acid. Suitable aminocarboxylic acids are for example: glycocoll, α-alanine, β-alanine, phenylglycine, phenylalanine and 2-aminocyclohexanecarboxylic acid.

In preferred dyes, A, B, C and D independently of one another are each the radical of a 1-hydroxy-2-aminobenzene which is unsubstituted or substituted by halogen, nitro, sulfo or low-molecular alkyl or alkoxy, or the radical of a 1-amino-2-hydroxy-4-sulfonaphthalene which is unsubstituted or substituted in the 6-position by chlorine, nitro or sulfo.

The radicals E and F are derived preferably from the following groups of coupling components: phenols which couple in the o-position and which are unsubstituted or substituted by low-molecular alkyl or alkoxy, dialkylamino or acylamino, where acylamino is $C_1$–$C_4$-alkanoylamino, $C_1$–$C_4$-alkylsulfonylamino, $C_1$–$C_4$-alkoxycarbonylamino, aroylamino or arylsulfonylamino groups; naphthols, which are unsubstituted or substituted by $C_1$–$C_4$-alkyl or -alkoxy, chlorine, amino, acylamino or sulfo, acylamino being as defined in the foregoing; 5-pyrazolones or 5-aminopyrazoles, which have in the 1-position a phenyl or naphthyl group which is unsubstituted or substituted by chlorine, nitro, $C_1$–$C_4$-alkyl or -alkoxy groups or sulfo groups, and have in the 3-position a $C_1$–$C_4$-alkyl or carboxyl group, especially a methyl group; naphthylamines which are unsubstituted or substituted by sulfo, sulfonamido or sulfone groups; acetoacetic acid amides, particularly acetoacetic acid anilides, and benzoylacetic acid anilides, which can be unsubstituted or substituted in the anilide nucleus by chlorine, bromine, nitro, $C_1$–$C_4$-alkyl or -alkoxy or sulfo groups; 6-hydroxy-3-cyano- or 6-hydroxy-3-carbonamido-4-alkyl-2-pyridones, which are substituted in the 1-position by unsubstituted or substituted $C_1$–$C_4$-alkyl, for example methyl, isopropyl, β-hydroxyethyl, β-aminoethyl or γ-isopropoxypropyl, or by phenyl, and which can carry in the 4-position a $C_1$–$C_4$-alkyl group, particularly methyl, or hydroxyquinolines.

Examples of such coupling components are: 2-naphthol, 1-naphthol, 1-acetylamino-7-naphthol, 1-propionylamino-7-naphthol, 1-carbomethoxyamino-7-naphthol, 1-carboethoxyamino-7-naphthol, 1-carbopropoxyamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 4-methyl-1-naphthol, 4-methoxy-1-naphthol, 4-acetyl-1-naphthol, 5,8-dichloro-1-naphthol, 5-chloro-1-naphthol, 2-naphthylamine, 2-naphthylamino-1-sulfonic acid, 1-naphthylamino-4- or -5-sulfonic acid, 2-aminonaphthalene-6-sulfonic acid, 2-aminonaphthalene-5-sulfonic acid, 6-methylsulfonyl-2-aminonaphthalene, 1-phenyl-3-methyl-pyrazol-5-one, 1-phenyl-5-pyrazolone-3-carboxylic acid amide, 1-(2'-, 3'- or 4'-sulfophenyl)-3-methylpyrazol-5-one, 1-(2'-chloro-5'-sulfophenyl)-3-methylpyrazol-5-one, 1-(2'-, 3'- or 4'-methylphenyl)-3-methylpyrazol-5-one, 1-(2'- or 4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2',5'- or 3',4'-dichlorophenyl)-3-methylpyrazol-5-one, 1-(2',5'-dichloro-4'-sulfophenyl)-3-methylpyrazol-5-one, 1-(2',3'- or 4'-sulfophenyl)-3-methyl-5-aminopyrazole, 1-phenyl-3-methyl-5-aminopyrazole, 1-(2'-chloro-5'-sulfophenyl)-3-methyl-5-aminopyrazole, acetoacetanilide, acetoacetanilide-4-sulfonic acid, acetoacet-o-anisidine, acetoacet-o-toluidide, acetoacet-o-chloroanilide, acetoacet-m-xylidide, tetralol, 4-methylphenol, 3-dialkylaminophenols, especially 3-dimethylamino- and 3-diethylaminophenol, 4-butylphenol, preferably 4-tert-butylphenol, 4-amylphenol, particularly 4-t-amylphenol, 2-isopropyl-4-methylphenol, 2- or 3-acetylamino-4-methylphenol, 2-methoxycarbonylamino-4-methylphenol, 2-ethoxycarbonylamino-4-methylphenol and 3,4-dimethylphenol, 1-methyl-3-cyano-4-ethyl-6-hydroxypyridone, 1-methyl-3-cyano-4-methyl-6-hydroxypyridone, 1-phenyl-3-carbonamido-4-methyl-6-hydroxypyridone and 1-ethyl-4-hydroxy-2-quinolone.

The coupling components E and F independently of one another are preferably each a 1- or 2-naphthol which is unsubstituted or substituted by amino and/or sulfo; 1- or 2-naphthylamine, unsubstituted or substituted by sulfo; or p-alkyl-($C_1$–$C_6$)-phenol, 1-phenyl-3-methyl-5-pyrazolone or acetoacetic acid anilide, and the phenyl group in the two last-mentioned compounds can be substituted by $C_1$–$C_4$-alkyl, $C_1$–$C_4$-alkoxy, chlorine or sulfo.

When Z and/or Z' are the —CH— group, E and/or F are the radical of an o-hydroxyaldehyde, preferably of an o-hydroxybenzaldehyde or o-hydroxynaphthaldehyde, which can be substituted by low-molecular alkyl, halogen, sulfo, naphthylazo, sulfonaphthylazo or in particular by phenylazo, wherein the phenyl group can be substituted by halogen, nitro, sulfo, $C_1$–$C_4$-alkyl, $C_1$–$C_4$-alkoxy or a further phenylazo group. Suitable aldehydes are for example: 2-hydroxy-1-naphthaldehyde, 1-hydroxy-2-naphthaldehyde, 2-hydroxybenzaldehyde, 3- and 5-methyl-2-hydroxybenzaldehyde, 3,5-dimethyl-2-hydroxybenzaldehyde, 5-butyl-2-hydroxybenzaldehyde, 5-chloro- or 5-bromo-2-hydroxybenzaldehyde, 3-chloro-2-hydroxybenzaldehyde, 3,5-dichloro-2-hydroxybenzaldehyde, 5-sulfo-2-hydroxybenzaldehyde, 3-methyl-5-chloro-2-hydroxybenzaldehyde, 5-(phenylazo)-2-hydroxybenzaldehyde, 5-(2'-, 3'- or 4'-sulfophenylazo)-2-hydroxybenzaldehyde, 5-(6'-sulfonaphthyl-1'-azo)-2-hydroxybenzaldehyde or 5-(4''-sulfo-4'-phenylazo)-phenylazo-2-hydroxybenzaldehyde.

$Ka^{\oplus}$ is preferably lithium, potassium or particularly sodium. In addition, $Ka^{\oplus}$ can be an ammonium cation or the ammonium salt of an organic amine.

n, $n_1$, $n_2$ and $n_3$ are preferably each zero, that is to say, the diazo components A, B, C and D in each case carry a hydroxyl group in the o-position with respect to the azo group.

Z and Z' are preferably each nitrogen.

Y is the radical of a coupling component of the formula II $$CH_3-CO-CH_2-CO-NH-G-OH \qquad (II).$$
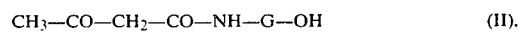

or of the formula III

wherein G is an unsubstituted or substituted benzene or naphthalene radical which carries the OH group in the o-position with respect to the coupling position, and K is $C_1$–$C_4$-alkyl, or a —COOR or

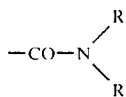

group, in which R is hydrogen or $C_1-C_4$-alkyl.

Suitable coupling components are for example: 6-acetoacetylamino-1-hydroxynaphthalene-3-sulfonic acid, 7-acetoacetylamino-1-hydroxynaphthalene-3-sulfonic acid, 5-acetoacetylamino-1-hydroxynaphthalene-3-sulfonic acid, 8-acetoacetylamino-1-hydroxynaphthalene-4-sulfonic acid, 8-acetoacetylamino-1-hydroxynaphthalene-3,6-disulfonic acid, 7-acetoacetylamino-1-hydroxynaphthalene-3,6-disulfonic acid, 8-acetoacetylamino-1-hydroxynaphthalene-3,5-disulfonic acid, 5-acetoacetylamino-1-hydroxynaphthalene-3,7-disulfonic acid, 8-acetoacetylamino-1-hydroxynaphthalene-4,6-disulfonic acid, 6-acetoacetylamino-2-hydroxynaphthalene-4-sulfonic acid, 1-(6'-hydroxy-8'-sulfonaphthyl-2')-3-methylpyrazolone-5, 1-(5'-hydroxy-7'-sulfonaphthyl-2')-3-methylpyrazolone-5, 1-(8'-hydroxy-6'-sulfonaphthyl-2')-3-methylpyrazolone-5, 1-(4'-hydroxy-6'-sulfonaphthyl-1')-3-methylpyrazolone-5, 1-(4'-hydroxy-6'-sulfonaphthyl-2')-3-carboxypyrazolone-5, 1-(4'-hydroxy-6'-sulfonaphthyl-2')-3-carboethoxypyrazolone-5, 1-(3'-hydroxy-4'-sulfophenyl-1')-3-methylpyrazolone-5.

Y is preferably the radical of a coupling component of the formula IV

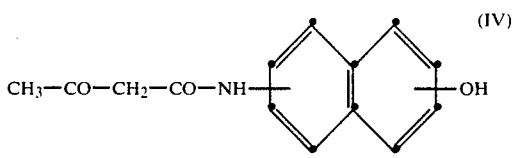

or of the formula V

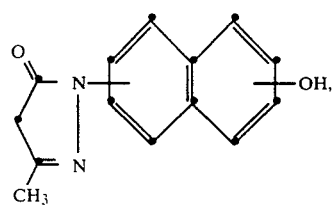

wherein the naphthalene groups are not further substituted, or in particular carry one or two sulfo groups.

In more especially preferred dyes of the formula I, Y is the radical of 1-(6'-hydroxy-8'-sulfonaphthyl-2')-3-methylpyrazolone-5 or, in particular, of 6- or 7-acetoacetylamino-1-hydroxynaphthalene-3-sulfonic acid or of 8-acetoacetylamino-1-hydroxynaphthalene-3,6-disulfonic acid.

Preferred dyes according to the invention correspond to the formula VI

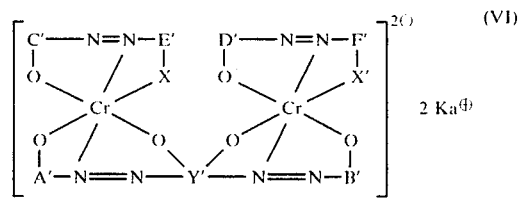

wherein

X and X' independently of one another are each oxygen or a group of the formula —NR—, in which R is hydrogen or $C_1-C_4$-alkyl, A', B', C' and D' independently of one another are each the radical of a diazo component of the benzene or naphthalene series, which carries the hydroxyl group in the o-position with respect to the azo group, E' and F' independently of one another are each the radical of a coupling component which carries the groups X and X' in the o- and α-positions, respectively, with respect to the azo group, Ka⊕ is a cation, and Y' is the radical of a coupling component of the formula IV

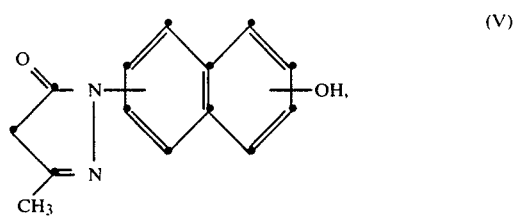

or of the formula V (V)

the naphthalene groups in the formulae IV and V not being further substituted, or carrying one or two sulfo groups.

Particularly preferred amongst these dyes are those in which A', B', C' and D' independently of one another are each the radical of a 1-hydroxy-2-aminobenzene, which is unsubstituted or substituted by halogen, nitro, sulfo or low-molecular alkyl or alkoxy, or the radical of a 1-amino-2-hydroxy-4-sulfonaphthalene, which is unsubstituted or substituted in the 6-position by nitro, wherein E' and F' independently of one another are each a 1- or 2-naphthol which is unsubstituted or substituted by amino and/or sulfo; 1- or 2-naphthylamine, unsubstituted or substituted by sulfo; or p-alkyl ($C_1-C_6$)-phenol, 1-phenyl-3-methyl-5-pyrazolone or acetoacetic acid anilide, and the phenyl group in the two last-mentioned compounds can be substituted by $C_1-C_4$-alkyl, $C_1-C_4$-alkoxy, chlorine or sulfo, and wherein X and X' independently of one another are each oxygen or —NH—, and Y' is the radical of 1-(6'-hydroxy-8'-sulfonaphthyl-2')-3-methylpyrazolone-5, 6- or 7-acetoacetylamino-1-hydroxynaphthalene-3-sulfonic acid or 8-acetoacetylamino-1-hydroxynaphthalene-3,6-disulfonic acid.

By virtue of their easy availability and their good dyeing properties, the particularly preferred dyes of the formula VI are those in which the monoazo dyes HO—C'—N=N—E'—XH and HO—D'—N=N—F'—X'H are identical and in which moreover A' and B' are identical.

The dyes according to the invention can be produced by methods known per se, for example by converting one mol of a dye of the formula VII

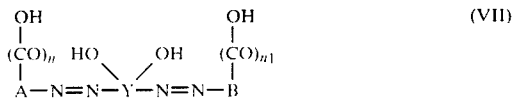

into the twofold 1:1 chrome complex, and then reacting this with 2 mols of a dye of the formula VIII

and/or of a dye of the formula IX

or preferably by firstly converting a dye of the formula(e) VIII and/or IX into the 1:1 chrome complex, and subsequently converting 2 mols of this with one mol of the unchromed dye of the formula VII into the twofold 1:2 chrome complex.

The symbols A, B, C, D, E, F, Z, Z', X, X', Y, n, $n_2$ and $n_3$ have the meanings defined under the formula I.

The chroming to the 1:1 chrome complex and the reaction of this with the unchromed dye to give the 1:2 chrome complex are performed by the customary methods.

When in the above process the dyes VIII and IX are different, there are formed mixtures of 1:2 metal complexes which have, besides complexes containing 2 molecules of the dye of the formula VIII or IX, also complexes containing one molecule each of the dyes of the formulae VIII and IX.

The novel metal complex dyes obtainable by the above processes are advantageously isolated in the form of their salts, particularly alkali metal salts, such as lithium, potassium and especially sodium salts, or ammonium salts. They are suitable for dyeing the most varied natural or synthetic materials containing nitrogen groups and hydroxyl groups, such as polyamides or polyurethanes, in particular however for dyeing wool and above all leather.

Suitable for the dyeing of wool or polyamide are particularly the dyes of the formula I which have only one sulfo group. The dyeings obtained are level and possess good fastness properties, such as good fastness to light, washing, water, hot water, perspiration, rubbing, fulling, decatising and carbonising.

For the dyeing of leather there are preferably used dyes having 2 to 5 sulfo groups. These dyes have a high colouring strength and they cover wall. They have good substantivity and are very stable to acid and to alkali, and give dyeings having good fastness properties, such as good fastness to diffusion, light, acid and alkali. Worthy of special mention are the good build-up properties of various types of leather, both on leather tanned only with chromium salts and on leather re-tanned with vegetable or synthetic tanning substances. Full orange-red to black shades are obtained.

Except where otherwise stated in the following Examples, 'parts' are parts by weight, and percentages are percent by weight.

EXAMPLE 1

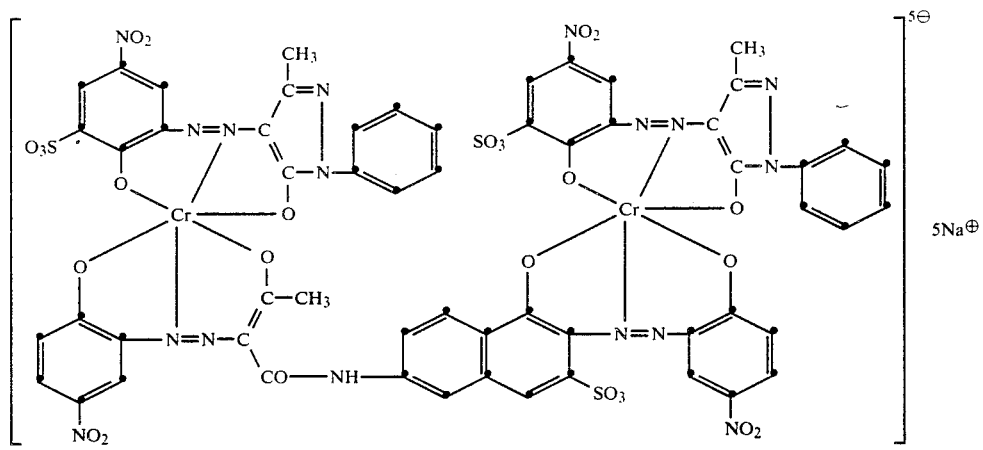

In 600 parts of water are suspended 46.9 parts of the complex chromium compound of the type 1 atom of chromium: 1 molecule of dye (which contains 5.2 parts of chromium and 41.9 parts of the monoazo dye formed from diazotised 4-nitro-2-amino-1-hydroxybenzene-6-sulfonic acid and 1-phenyl-3-methyl-5-pyrazolone) with 32.7 parts of the disazo dye formed from 2 mols of diazotised 4-nitro-2-amino-1-hydroxybenzene and 1 mol of 2-acetoacetylamino-5-hydroxynaphthalene-7-sulfonic acid. The reaction mixture is then heated to 80° to 85° C.; the pH value is subsequently adjusted to 7 to 7.5 with 5N sodium hydroxide, and the reaction mixture is held at this temperature and at a constant pH value until the starting products are no longer detectable. After completion of the addition reaction, the dye is isolated by concentration by evaporation. The product thus obtained is in the form of a dark powder which dissolved in water to give a brown shade, and which dyes leather in fast brown shades.

EXAMPLE 2

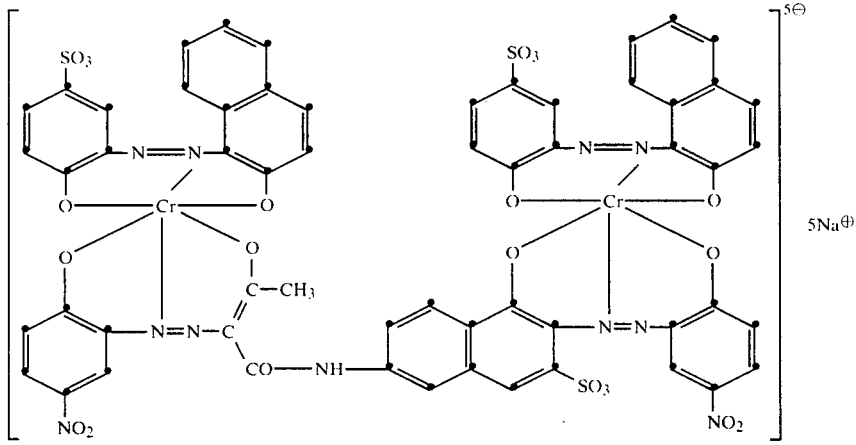

The 1:1 chrome complex containing 34.4 parts of the dye formed from diazotised 2-amino-1-hydroxybenzene-4-sulfonic acid and 2-hydroxynaphthalene, as well as 5.2 parts of chromium, is introduced into 600 parts of water; there are then added 32.7 parts of the disazo dye formed from 2 mols of diazotised 4-nitro-2-amino-1-hydroxybenzene and 1 mol of 2-acetoacetylamino-5-hydroxynaphthalene-7-sulfonic acid. The reaction mixture is thereupon heated to 80° to 85° C.; the pH value is adjusted to 7 to 7.5 with sodium hydroxide, and the mixture is held at this temperature and at a constant pH value until the starting products are no longer detectable. After completion of the reaction, the dye is isolated by concentration by evaporation. There is thus obtained a dark powder which dissolves in water to give a brownish-violet colour, and which dyes leather in fast brownish-violet shades.

When the procedure is carried out as described in Examples 1 and 2 except that the respective disazo dye listed in column 2 of the following Table 1 is reacted with 2 mols of the 1:1 chrome complex shown opposite in column 3, there are obtained, conditions otherwise being the same, dyes of analogous structure which have the shades given in column 4, and which dye leather in shades having good fastness properties.

TABLE I

| No. | Disazo dye | 1:1 Chrome complex of | Shade |
|---|---|---|---|
| 1 | | | brown |
| 2 | | | brown |
| 3 | | | brownish-grey |
| 4 | | | violet-brown |

TABLE I-continued

| No. | Disazo dye | 1:1 Chrome complex of | Shade |
|---|---|---|---|
| 5 | | | violet-brown |
| 6 | | | violet-brown |
| 7 | | | brownish-grey |
| 8 | | | violet-brown |
| 9 | | | grey |
| 10 | | | grey |
| 11 | | | greenish-grey |
| 12 | | | greenish-grey |

TABLE I-continued

| No. | Disazo dye | 1:1 Chrome complex of | Shade |
|---|---|---|---|
| 13 | | | yellowish-brown |

EXAMPLE 3

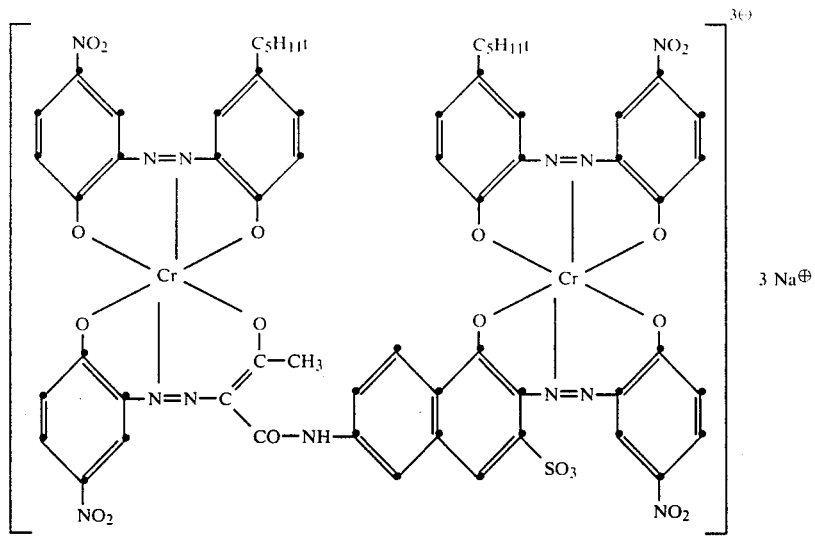

36.5 parts of the 1:1 chrome complex containing 31.5 parts of the dye formed from diazotised 4-nitro-2-amino-1-hydroxybenzene and 4-tert-amyl-1-hydroxybenzene, as well as 5.2 parts of chromium, are suspended with 32.7 parts of the disazo dye, which is formed from 2 mols of diazotised 4-nitro-2-amino-1-hydroxybenzene and 1 mol of 2-acetoacetylamino-5-hydroxynaphthalene-7-sulfonic acid, in 600 parts by volume of ethylene glycol. The reaction mixture is heated to 80° to 85° C.; the pH value is then adjusted to 7 to 7.5 with 5N sodium hydroxide, and the mixture is held at this temperature and at a constant pH value until the addition reaction has finished. The chromium-containing dye is thereupon precipitated by the addition of saturated sodium chloride solution, filtered off and dried. It is in the form of a dark powder which dissolves in water to give a brown colour, and which dyes wool, polyamide fibres and also leather in fast brown shades.

When the procedure is carried out as described in Example 3 except that the respective disazo dye listed in column 2 of the following Table II is reacted with 2 mols of the 1:1 chrome complex shown opposite in column 3, there are obtained, with otherwise the same conditions, dyes of analogous structure which have the shades given in column 4, and which dye leather in shades having good fastness properties.

TABLE II

| No. | Disazo dye | 1:1 Chrome complex of | Shade |
|---|---|---|---|
| 1 | | | violet-brown |
| 2 | " | | brownish-grey |

TABLE II-continued

| No. | Disazo dye | 1:1 Chrome complex of | Shade |
|-----|------------|----------------------|-------|
| 3 | " | (structure with OH, N=N, OH, Cl) | brownish-violet |
| 4 | " | (structure with OH, N=N—C, NO₂, C—N, C=N, CH₃, phenyl) | brown |
| 5 | " | (structure with OH, N=N—C, NO₂, C—CH₃, CO—NH-phenyl) | yellowish-brown |

EXAMPLE 4

In 500 parts of water are suspended 36.2 parts of the disazo dye formed from 2 mols of diazotised 4-sulfo-2-amino-1-hydroxybenzene and 1 mol of 7-acetoacetylamino-1-hydroxynaphthalene-3-sulfonic acid. There is subsequently added the 1:1 chrome complex containing 41.9 parts of the dye formed from diazotised 4-nitro-2-amino-1-hydroxybenzene-6-sulfonic acid and 1-phenyl-3-methyl-5-pyrazolone, as well as 5.2 parts of chromium. The reaction mixture is heated to 80° to 85° C.; the pH value is then adjusted with sodium hydroxide (5N) to 7 to 7.5, and the mixture is held at this temperature and at a constant pH value until no further starting products are detectable. After the addition reaction is finished, the dye is isolated by concentration by evaporation. The product obtained is in the form of a dark powder which dissolved in water to give a brown colour, and which dyes leather in fast brown shades.

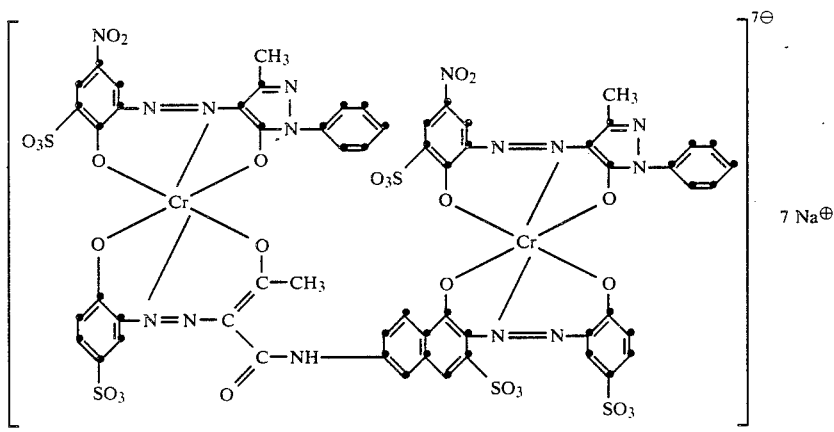

EXAMPLE 5

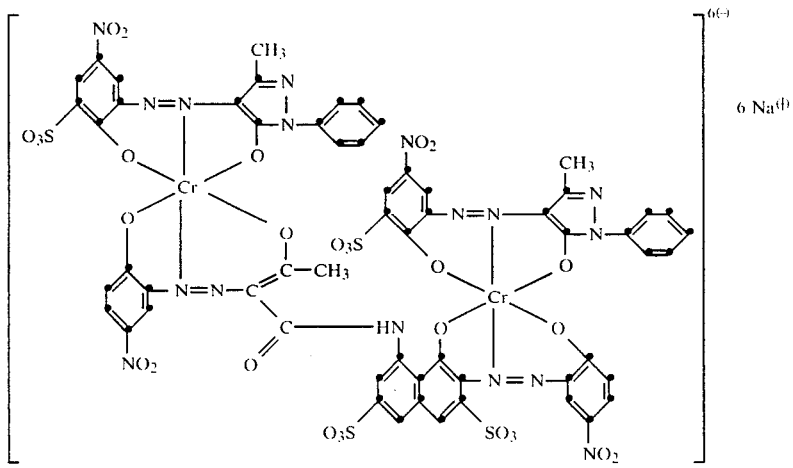

In 600 parts of water are suspended 36.7 parts of the disazo dye formed from 2 mols of diazotised 4-nitro-2-amino-1-hydroxybenzene and 1 mol of 8-acetoacetylamino-1-hydroxynaphthalene-3,6-disulfonic acid. There is subsequently added the 1:1 chrome complex containing 41.9 parts of the dye formed from diazotised 4-nitro-2-amino-1-hydroxybenzene-6-sulfonic acid and 1-phenyl-3-methyl-5-pyrazolone, as well as 5.2 parts of chromium. The reaction mixture is then heated to 80° to 85° C.; the pH value is adjusted with 5N sodium hydroxide to 7 to 7.5, and the mixture is held at this temperature and at a constant pH value until the starting products are no longer detectable. When the reaction is finished, the dye is isolated by concentration by evaporation. It is in the form of a dark powder which dissolves in water to give a brown colour, and which dyes leather in fast brown shades.

When the procedure is performed as described in Examples 4 and 5 except that the disazo dye listed in column 2 of the following Table III is reacted with 2 mols of the 1:1 chrome complex given in column 3, there are obtained dyes of analogous structure which have the shades shown in column 4 and which dye leather in shades having good fastness properties.

TABLE III

| No. | Disazo dye | 1:1 Chrome complex of | Shade |
|---|---|---|---|
| 1 | (structure) | (structure) | violet-brown |
| 2 | " | (structure) | dull brownish-grey |
| 3 | " | (structure) | bluish-brown |
| 4 | " | (structure) | yellowish-brown |

TABLE III-continued

| No. | Disazo dye | 1:1 Chrome complex of | Shade |
|---|---|---|---|
| 5 | " | 2-hydroxy-4-nitrophenyl-azo-1-hydroxy-naphthalene-sulfonic acid complex | bluish-grey |
| 6 | " | hydroxy-sulfo-nitro-naphthyl-azo-hydroxy-naphthalene complex | reddish-blue |
| 7 | HO₃S-(OH)-N=N-(OH)(HO₃S)-NH-C(=O)-C(-OH,CH₃)=N-N-(OH)(SO₃H)(NO₂) | HO₃S-(OH)(NO₂)-N=N-(OH)-naphthyl | bluish brown |
| 8 | " | OH-(O₂N)-N=N-naphthyl(NH₂)(SO₃H) | dull olive |
| 9 | " | HO₃S-(OH)(NO₂)-N=N-(OH)(HO₃S)-naphthyl-NH₂ | brownish-olive |
| 10 | " | HO₃S-(OH)(NO₂)-N=N-(OH)(C₄H₉t)-phenyl | brown |
| 11 | O₂N-(OH)-N=N-(OH)(HO₃S)-naphthyl-NH-C(=O)-C(-OH,CH₃)=N-N-(OH)(NO₂)(SO₃H) | OH-(O₂N)-N=N-naphthyl(NH₂)(SO₃H) | brownish grey |
| 12 | " | HO₃S-(OH)(NO₂)-N=N-pyrazolone(OH,CH₃,phenyl) | brown |
| 13 | " | OH-(O₂N)-N=N-(OH)-naphthyl(SO₃H) | reddish-brown |

TABLE III-continued

| No. | Disazo dye | 1:1 Chrome complex of | Shade |
|---|---|---|---|
| 14 | " | (structure: HO₃S, OH, OH, N=N, NO₂, naphthalene) | brown |
| 15 | " | (structure: OH, OH, N=N, O₃S, naphthalene-naphthalene) | grey |
| 16 | " | (structure: OH, OH, N=N, HO₃S, NO₂, naphthalene-naphthalene) | bluish-brown |
| 17 | " | (structure: HO₃S, OH, OH, N=N, NH₂, NO₂, HO₃S) | brown |
| 18 | " | (structure: HO₃S, OH, OH, N=N, CH₃, C(=O)NH-phenyl, NO₂) | yellowish brown |
| 19 | " | (structure: HO₃S, OH, OH, N=N, NO₂, C₄H₉t) | bluish-brown |
| 20 | (structure: OH, OH, N=N, H₃C, OH, NH-C(=O)-C=N-N, OH, NO₂, HO₃S, SO₃H, NO₂) | (structure: OH, OH, N=N, O₂N, SO₃H, naphthalene) | grey |
| 21 | " | (structure: OH, NH₂, N=N, O₂N, SO₃H, naphthalene) | olive-green |

TABLE III-continued

| No. | Disazo dye | 1:1 Chrome complex of | Shade |
|---|---|---|---|
| 22 | " | 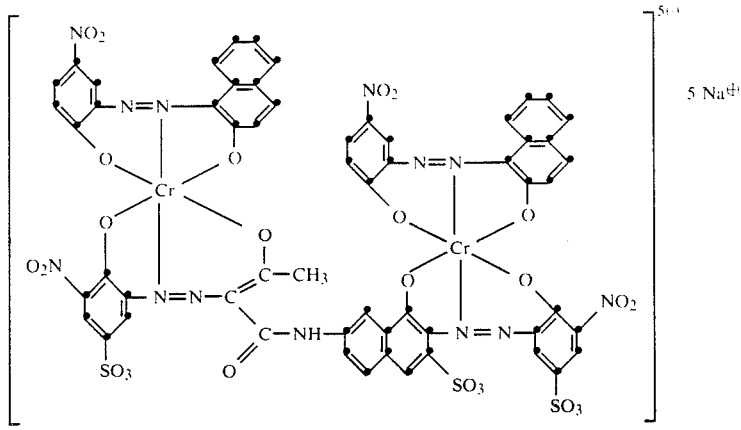 | brown-ish grey |

EXAMPLE 6

40.7 parts of the disazo dye formed from 2 mols of diazotised 4-sulfo-6-nitro-2-amino-1-hydroxybenzene and 1 mol of 7-acetoacetylamino-1-hydroxynaphthalene-3-sulfonic acid are suspended in 400 parts by volume of ethylene glycol. There is then added the 1:1 chrome complex containing 30.9 parts of the dye formed from diazotised 4-nitro-2-amino-1-hydroxybenzene and 2-hydroxynaphthalene, as well as 5.2 parts of chromium. The reaction mixture is heated to 80° to 85° C.; the pH value is adjusted to 7 to 7.5 with 5N sodium hydroxide, and the mixture is held at this temperature and at a constant pH until the addition reaction is finished. The chrome complex is precipitated by the addition of saturated sodium chloride solution, filtered, washed with saturated sodium chloride solution and dried. It is in the form of a dark powder which dissolves in water to give a black colour and which dyes leather in fast black shades.

When the procedure is performed as described in Example 6 except that the respective disazo dye listed in column 2 of the following Table IV is reacted with 2 mols of the 1:1 chrome complex given opposite in column 3, there are obtained dyes of analogous structure which have the shades shown in column 4 and which dye leather in shades having good fastness properties.

EXAMPLE 7

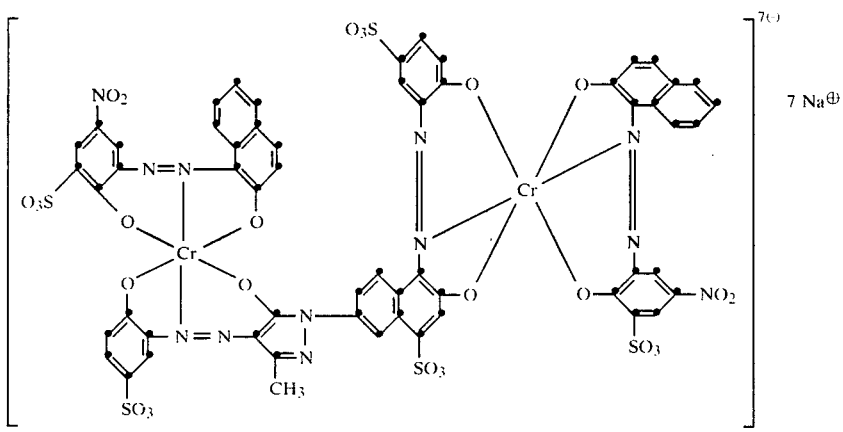

36.0 parts of the disazo dye formed from 2 mols of diazotised 4-sulfo-2-amino-1-hydroxybenzene and 1 mol of 1-(6'-hydroxy-8'-sulfonaphthyl-2')-3-methylpyrazolone-5 are suspended in 500 parts of water. There is then added the 1:1 chrome complex containing 38.9 parts of the dye formed from diazotised 4-nitro-2-amino-1-hydroxybenzene-6-sulfonic acid and 2-hydroxynaphthalene, as well as 5.2 parts of chromium. The reaction mixture is heated to 80° to 85° C.; the pH value is adjusted to 7 to 7.5 with 5N sodium hydroxide, and the mixture is held at this temperature and at a constant pH value until no further starting products are detectable. After the addition reaction is finished, the dye is isolated by concentration by evaporation. There is obtained a dark powder which dissolves in water to give a brown colour, and which dyes leather in fast brown shades.

When the procedure is performed as described in Example 7 except that the respective disazo dye listed in column 2 of the following Table V is reacted with 2 mols of the 1:1 chrome complex given opposite in column 3, there are obtained dyes of analogous structure which have the shades shown in column 4 and dye leather in shades having good fastness properties.

TABLE V

| No. | Disazo dye | 1:1 Chrome complex of | Shade |
|---|---|---|---|
| 1 | [structure] | [structure] | brown |
| 2 | [structure] | [structure] | yellowish-brown |

TABLE V-continued

| No. | Disazo dye | 1:1 Chrome complex of | Shade |
| --- | --- | --- | --- |
| 3 | (structure) | (structure) | brownish-grey |

Dyeing instructions for leather 100 parts of neutralised chrome-tanned cow-hide are dyed with 1.0 part of the dye of Example 1 in 500 parts of water at 50° C. After 30 minutes, there are added to the dye liquor 3 parts of a synthetic fat-liquouring agent (mixture of alkylbenzenes, aliphatic hydrocarbons, alkanesulfonic acids and tensides), and after a further 30 minutes 0.5 part of 85% formic acid diluted with 5 parts of water. The leather is rinsed with water after 20 minutes, and the dyeing is finished in the customary manner. A brown dyeing having good fastness properties is obtained.

Dyeing instructions for polyamide 100 parts of polyamide knitting yarn are introduced at 50° C. into a dye bath containing, to 4000 parts of water, 2 parts of the dye of Example 3, 4 parts of ammonium sulfate and 2 parts of a levelling agent. The liquor is brought to boiling in the course of 45 minutes, and is held for a further 45 minutes at the boiling temperature. The dyed material is thereupon removed, thoroughly rinsed with cold water and dried. The result is a polyamide which has been dyed brown and which has good fastness properties.

Dyeing instructions for wool 100 parts of wool knitting yarn are introduced into a dye bath at 50° C., which contains, to 4000 parts of water, 2 parts of the dye of formula 3, 4 parts of ammonium sulfate and 2 parts of a levelling agent. The liquor is brought to boiling in the course of 45 minutes, and is held at the boiling temperature for a further 45 minutes. The dyed material is then removed, thoroughly rinsed with cold water and dried. A wool which is dyed in a brown shade and which has good fastness properties is obtained.

What is claimed is:

1. A chrome complex dye of the formula

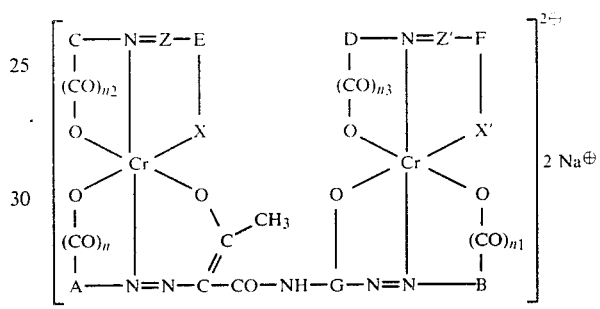

or of the formula

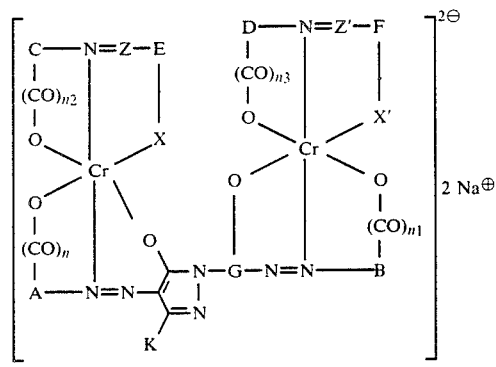

wherein

Z and Z' independently of one another are each nitrogen or —CH—;

X and X' independently of one another are each oxygen, or a group of the formula —NR—, in which R is hydrogen or $C_1$-$C_4$-alkyl, provided X is oxygen when Z is —CH— and provided X' is oxygen when Z' is —CH—;

A and B independently of one another are each a benzene or naphthalene radical of a diazo component which carries the hydroxyl or carboxyl group in the o-position with respect to the azo group;

C and D independently of one another are each a benzene or naphthalene radical which carries in the o-position with respect to the azo or azomethine group a hydroxyl or carboxyl group, or, if $n_2$ or $n_3$ is 1 and Z or Z' is CH, an alkyl, phenylalkyl or cycloalkyl radical;

E and F independently of one another are each the radical of a coupling component when Z or Z' is nitrogen, the coupling component containing in the o- and alpha-positions with respect to the azo group the groups X and X', respectively, or the radical of an o-hydroxyaldehyde when Z or Z' is —CH—;

n, $n_1$, $n_2$ and $n_3$ independently of one another are each zero or 1;

$Ka^\oplus$ is a cation; and

G is a benzene or naphthalene radical which contains the OH group in the o-position with respect to the coupling position on the group G; and K is the $C_1$–$C_4$-alkyl group or a —COOR or the

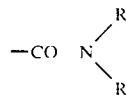

group, in which R is hydrogen or $C_1$–$C_4$-alkyl.

2. A chrome complex dye according to claim 1, wherein A, B, C and D independently of one another are each the radical of a 1-hydroxy-2-aminobenzene, which is unsubstituted or substituted by halogen, nitro, sulfo or $C_1$–$C_6$ alkyl or alkoxy, or the radical of a 1-amino-2-hydroxy-4-sulfonaphthalene, which is unsubstituted or substituted in the 6-position by nitro.

3. A chrome complex dye according to claim 1, wherein Z or Z' is nitrogen, and the coupling components E and F independently of one another are each a 1- or 2-naphthol which is unsubstituted or substituted by amino and/or sulfo; 1- or 2-naphthylamine, unsubstituted or substituted by sulfo; or p-alkyl-($C_1$–$C_6$)-phenol, 1-phenyl-3-methyl-5-pyrazolone or acetoacetic acid anilide, and the phenyl group in the two last-mentioned compounds is unsubstituted or substituted by $C_1$–$C_4$-alkyl, $C_1$–$C_4$-alkoxy, chlorine or sulfo.

4. A chrome complex dye according to claim 1 wherein one or both of Z and Z' are —CH—, and one or both of E and F is a radical of o-hydroxybenzaldehyde or o-hydroxynaphthaldehyde which is unsubstituted or substituted by $C_1$–$C_6$-alkyl, halogen, sulfo, naphthylazo, sulfonaphthylazo or phenylazo, wherein the phenyl group is unsubstituted or substituted by halogen, nitro, sulfo, $C_1$–$C_4$-alkyl, $C_1$–$C_4$-alkoxy or phenylazo.

5. A chrome complex dye according to claim 1 wherein G is a naphthalene radical which is unsubstituted or substituted by one or two sulfo groups and K is methyl.

6. A chrome complex dye according to claim 1, wherein n, $n_1$, $n_2$ and $n_3$ are each zero.

7. A chrome dye complex according to claim 5 wherein G is a naphthalene radical substituted by:

(a) —N=N—B in the 1-position, by oxygen in the 2-position, by sulfo in the 4-position, and by a 3-methyl-5-pyrazolone radical in the 6-position;

(b) oxygen in the 1-position, by sulfo in the 3-position, and by an acetoacetylamino radical in the 6- or 7-position; or (c) oxygen in the 1-position, by —N=N—B in the 2-position, by sulfo groups in the 3- and 6-positions, and by an acetoacetylamino radical in the 8-position.

8. A chrome dye complex of the formula

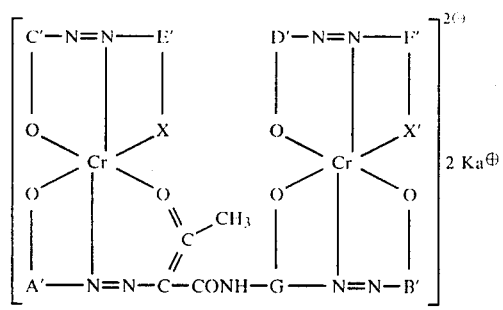

or of the formula

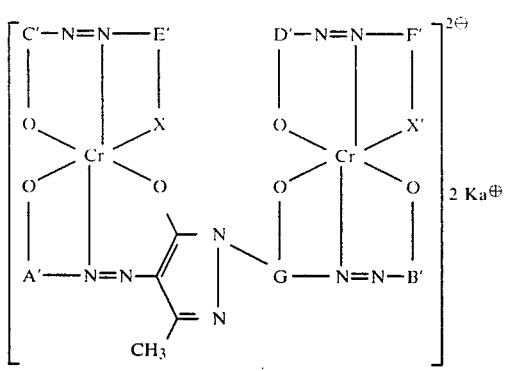

wherein

X and X' independently of one another are each oxygen or —NR—, in which R is hydrogen or $C_1$–$C_4$-alkyl;

A', B', C' and D' independently of one another are each a benzene or naphthalene radical which carries the hydroxyl group in the o-position with respect to the azo group;

E' and F' independently of one another are each the radical of a coupling component which carries the groups X and X' in the o- and alpha-positions, respectively, with respect to the azo group;

$Ka^\oplus$ is a cation; and

G is a naphthalene radical which is unsubstituted or substituted by one or two sulfo groups.

9. A chrome complex dye according to claim 8 wherein:

A', B', C' and C' independently of one another are each the radical of a 1-hydroxy-2-aminobenzene, which is unsubstituted or substituted by halogen, nitro, sulfo or alkyl or alkoxy, or the radical of a 1-amino-2-hydroxy-4-sulfonaphthalene, which is unsubstituted or substituted in the 6-position by nitro;

E' and F' independently of one another are each a 1- or 2-naphthol which is unsubstituted or substituted by amino or sulfo; 1- or 2-naphthylamine, unsubstituted or substituted by sulfo; or p-alkyl-($C_1$–$C_6$)-phenol, 1-phenyl-3-methyl-5-pyrazolone or acetoacetic acid anilide, wherein the phenyl group in the two last-mentioned compounds is unsubstituted or substituted by $C_1$–$C_4$-alkyl, $C_1$–$C_4$-alkoxy, chlorine or sulfo;

X and X' independently of one another are each oxygen or —NH—; and

G is a naphthalene radical substituted by:
(a) —N=N—B in the 2-position, by oxygen in the 2-position, by sulfo in the 4-position, and by a 3-methyl-5-pyrazolone radical in the 6-position;
(b) oxygen in the 1-position, by sulfo in the 3-position, and by an acetoacetylamino radical in the 6- or 7-position; or
(c) oxygen-to-chromium in the 1-position, by —N= N—B in the 2-position, by sulfo groups in the 3- and 6-positions, and by an acetoacetylamino radical in the 8-position.

10. A chrome complex dye according to claim 8, wherein the monoazo dyes HO—C'—N=N—E'—XH and HO—D'—N=N—F'—X'H are identical and in which moreover A' and B' are identical.

* * * * *